United States Patent [19]
Cotter et al.

[11] Patent Number: 5,135,100
[45] Date of Patent: Aug. 4, 1992

[54] TRACK INTERSECTION PIN GUIDE

[75] Inventors: David H. Cotter, Coopersville; Curtis E. LeMay, Shelbyville, both of Mich.

[73] Assignee: Rapistan Corporation, Grand Rapids, Mich.

[21] Appl. No.: 606,504

[22] Filed: Oct. 31, 1990

[51] Int. Cl.⁵ .................................................. B65G 47/46
[52] U.S. Cl. ...................................... 198/370; 198/372
[58] Field of Search ......................... 198/365, 370, 372

[56] References Cited

U.S. PATENT DOCUMENTS

| | | |
|---|---|---|
| 126,106 | 4/1972 | Townsend . |
| 405,088 | 6/1989 | Ferguson . |
| 988,051 | 3/1911 | Vallarino . |
| 1,236,389 | 1/1914 | Augensen . |
| 2,318,221 | 5/1943 | Hayssen et al. . |
| 3,277,995 | 11/1966 | Seed . |
| 3,288,268 | 11/1966 | Fehely . |
| 3,361,247 | 1/1968 | Lauzon et al. . |
| 3,542,215 | 11/1970 | Fromme et al. . |
| 3,710,923 | 1/1973 | Fromme et al. . |
| 3,770,100 | 11/1973 | McCaul . |
| 3,771,648 | 11/1973 | Revuelta . |
| 3,780,850 | 12/1973 | McSwiggin . |
| 3,986,596 | 10/1976 | Hamilton ........................ 198/365 |
| 3,987,888 | 10/1976 | Wickam ...................... 198/365 X |
| 4,003,465 | 1/1977 | Bauer . |
| 4,717,011 | 1/1988 | Yu et al. . |
| 4,732,259 | 3/1988 | Yu et al. . |
| 4,738,347 | 4/1988 | Brouwer et al. . |
| 4,884,677 | 12/1989 | Yu et al. . |
| 4,946,022 | 8/1990 | Davis et al. ...................... 198/365 |
| 4,971,190 | 11/1990 | Berends et al. . |
| 5,027,939 | 7/1991 | Kilper et al. ................ 198/372 X |

*Primary Examiner*—D. Glenn Dayoan
*Attorney, Agent, or Firm*—Price, Heneveld, Cooper, DeWitt & Litton

[57] ABSTRACT

A switch for use at the intersection of two pallet pin guide tracks in a conveyor, the switch having a switch plate with a recessed pallet pin channel therein, a pivot pin supporting the switch plate for pivotal movement to align the pin channel with either one of the tracks, a locking device for alternately holding the switch plate in alignment with each of the guide tracks, a pallet actuatable device for releasing the switch plate from the locking device when the pallet approaches the switch along the guide tracks with which the guide pin track of the switch is not aligned and a suface of the switch plate for causing it to pivot about its pivot pin to align its guide pin track with an approaching pallet pin.

21 Claims, 6 Drawing Sheets

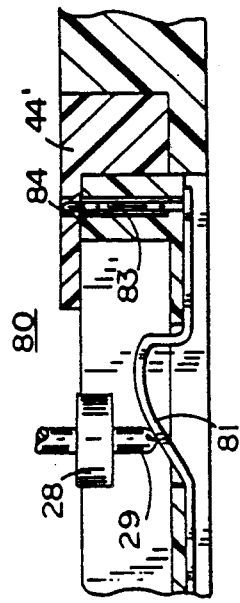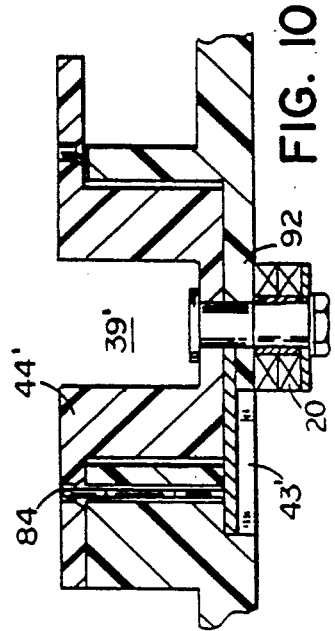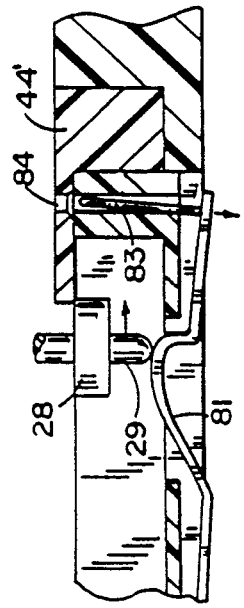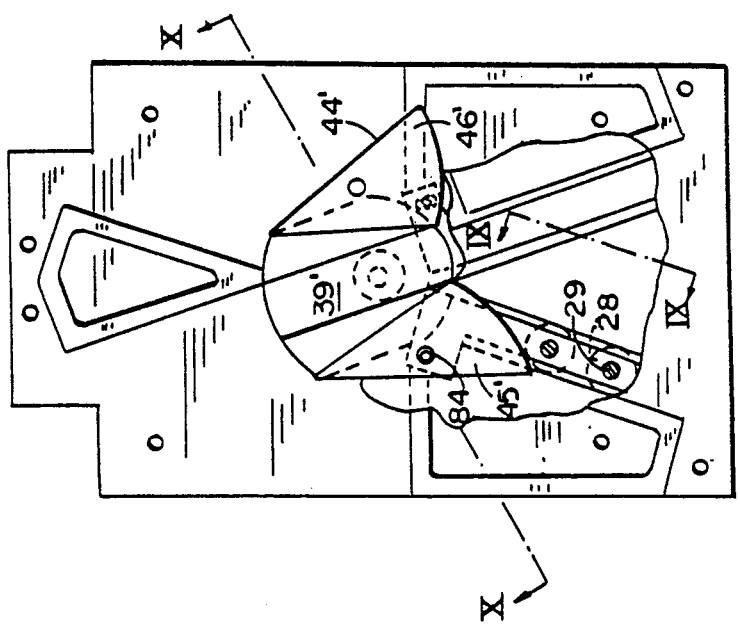

TRACK INTERSECTION PIN GUIDE

BACKGROUND OF THE INVENTION

This invention relates generally to the guiding of a diverting shoe or pallet pin track intersection in a conveyor used in article sorting systems.

Positive displacement sortation conveyors, also known as article sorters, are well-known in the art. These systems include an article conveyor capable of handling a large volume of articles such as boxes of various sizes and weights. Where only single sided sortation is required, the conveyor uses shoes, or pallets, which are attached to either side of the slatted surface sections of the conveyor. A control determines, according to article size, the correct number of shoes required to push the article off the conveyor and onto a sortation spur which is located on one side of the conveyor. As an article that is to be discharged approaches the sortation point, the control actuates a diverter switch to displace an appropriate number of shoes onto a diagonal guide track. A lateral force is applied to the side of the article by lateral displacement of the appropriate shoes, to push the article onto the sortation spur.

A problem arises, however, when alternative tracks are adjacent on opposite lateral sides of the conveyor system. This requires a crossing of the oppositely heading guide tracks associated with the adjacent spurs. A switching system is required at the point of guide track intersection to direct the shoes through the intersection so continued force is applied to the article pushing it along the desired path.

The prior art teaches conveyor systems, such as that shown by Lauzon et al. U.S. Pat. No. 3,361,247 which utilizes a crossover pin guide, or switch, permitting lateral transfer from either the left or right side of the conveyor. The crossover switch utilizes a base plate connected to a reactivating element which acts to deflect an oncoming cam roller. The base plate is pivoted to allow the cam roller to pass through the intersection. The switch provides a positive guard against the pin being inadvertently directed into the wrong track. After being pivoted to the alternative direction or track, the switch permitted the pin to pass through in addition to providing a positive guard against the pin being inadvertently directed into the other track. Lauzon et al. was an improvement over prior art systems because the energy required to shift the position of the switch was provided by motion of the oncoming pin from the approaching shoe, or pallet, without the use of solenoids or other powered operating devices.

SUMMARY OF THE INVENTION

The invention provides a non-powered, self-position-adjusting track intersection pin guide, or switch. The switch has a single, recessed, guide pin channel through which the guide pin of an approaching shoe can pass, if the channel of the switch is aligned with the guide pin track along which the guide pin is approaching The switch is equipped with a pair of locking pins each of which is capable of locking the switch with its guide pi channel aligned with one of the intersecting tracks Each of the locking pins is mounted on actuating means which is depressed by an approaching shoe, thus, releasing the switch to pivot to align its guide pin channel with the track along which the shoe is approaching. Means may be provided to retract the actuating means associated with a particular switch channel, if the switch is already aligned with that channel.

An apparatus according to a first aspect of the invention includes a non-powered switch, used at a guide pin track intersection, which is in the form of a frog having a single guide pin channel which, in one position, is aligned with one of the intersecting tracks and, in a second position, is aligned with the other of the tracks. The frog is provided with a pair of divergent wings each of which provides a cam surface to cause the switch to change its position and align the guide pin channel with the oncoming shoe in the event the channel is already not so aligned. The frog is held in alignment with each one of the tracks by a pair of locking pins which are releasable to allow the frog to switch.

Each of the locking pins is mounted at the end of a resilient member which has a cam portion extending into the path of the guide pin of an approaching shoe. If the frog is blocking the guide pin track, the cam will depress the resilient member withdrawing the associated locking pin, releasing the frog to align with the track along which the guide pin is approaching. The other locking pin is then inserted in order to lock the frog in the new position. When the frog is aligned with the track along which the shoe and guide pin are approaching, the lock pin associated with that track will be held depressed and the lock resilient member associated with that track will be retracted to allow subsequent shoes to pass without striking the cam portion.

These and other objects, advantages and features of this invention will become apparent upon review of the following specification in conjunction with the drawings.

BRIEF DESCRIPTION OF THE DRAWINGS

FIG. 8 is a top plan view of a second embodiment of a track intersection pin guide according to the invention;

FIG. 9 is a sectional view taken along the lines IX—IX of FIG. 8;

FIGS. 10 is a sectional view taken along the lines X—X in FIG. 8; and

FIG. 11 is the same view as FIG. 9, showing the reaction of the pin guide to an oncoming shoe.

DESCRIPTION OF THE PREFERRED EMBODIMENT

Referring now specifically to the drawings and the illustrative embodiments depicted therein, a conveyor, generally identified at 10, has side members 11, which support a powered article conveying surface 12 defined by a plurality of article supporting and transporting slats 13 extending transversely on the conveyor (FIG.

Figure 2:
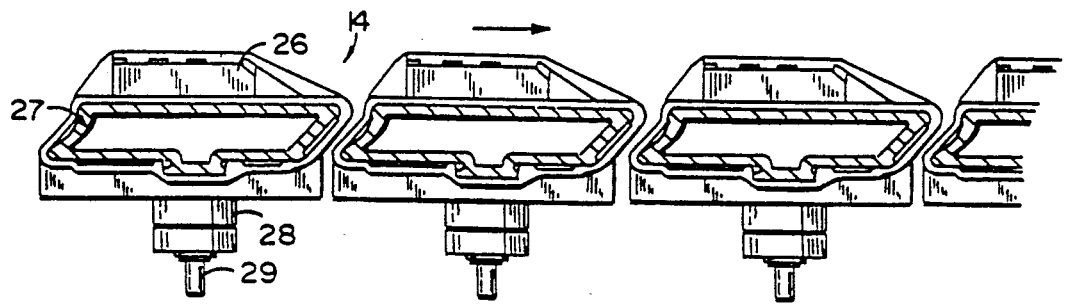
FIG. 2 is a side view of shoes attached to the slatted section of the conveyor.
Figure 3:
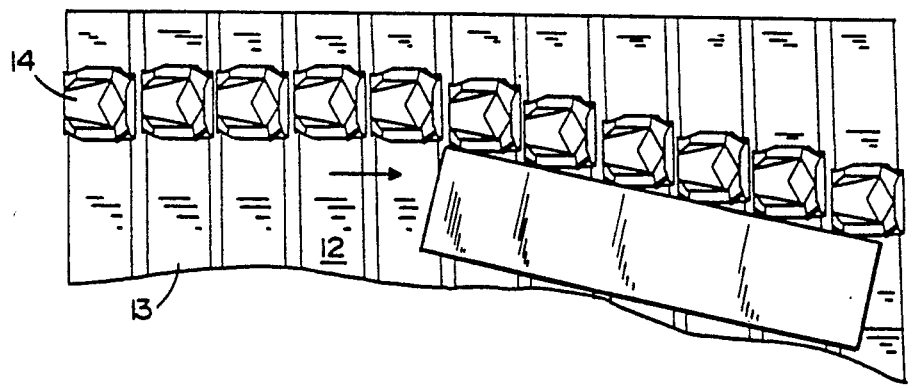
FIG. 3 is a top view of the conveyor slats with shoes illustrating their direction of motion.

1). The ends of the slats are secured to and propelled by endless drive members, such as chains (not shown), which are recessed in the side members 11. A shoe assembly 14 is glideably attached to each slat 13 (FIGS. 2 and 3). Each shoe assembly includes an upper diverting member 26 which is used to contact a package being conveyed on top of the conveying surface 12. A lower supporting member 27 is attached to the upper diverting member 26 and includes a pin 29 and bearing 28 used to move the shoe assembly laterally along the associated slat 13. Details of the shoes and slats are more fully disclosed in commonly owned copending application Ser. No. 606,585, filed concurrently herewith, invented by David Cotter, Bernard Woltjer and Curtis E. LeMay, entitled MODULAR DIVERTER SHOE AND SLAT CONSTRUCTION, the disclosure of which is hereby incorporated herein by reference. The movement of the shoe assemblies provides a lateral force to displace a package on top of the conveyor slats. In FIG. 3, a package is shown being pushed to the lower right toward a sortation spur on the right side (not shown). However, conveyor 10 is capable of discharging pallets to spurs on the left side of the conveyor.

Pin 29 rides within a guide track 17 along one side of the conveyor 10 until a diverter switch 18 is actuated in response to signals from a control system (not shown). When diverter switch 18 is actuated, pin 29 is diverted onto a diagonal track 19 which guides movement of the shoe via its bearing 28 engaging the track. Diagonal track 19 traverses diagonally to a position occupied by a pin guide, or crossover switch, assembly 40. Diverter switch 18 is disclosed more fully in commonly owned copending application Ser. No. 606,885, filed concurrently herewith, now U.S. Pat. No. 5,038,912 invented by David Cotter, entitled VERTICALLY ACTUATED DIVERTING SWITCH, the disclosure of which is hereby incorporated herein by reference.

Figure 1:
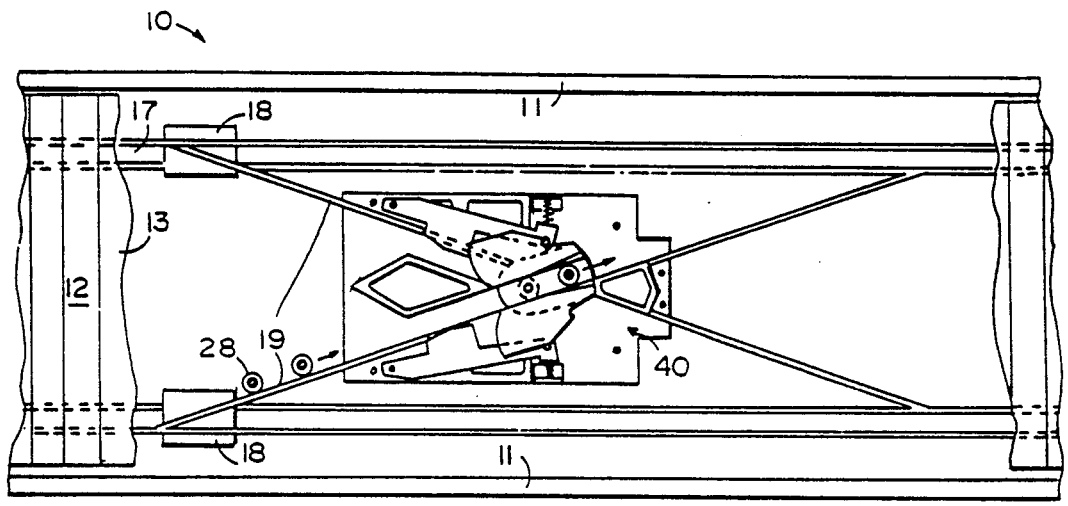
FIG. 1 is a top plan view of an article conveyor system.
Figure 6:
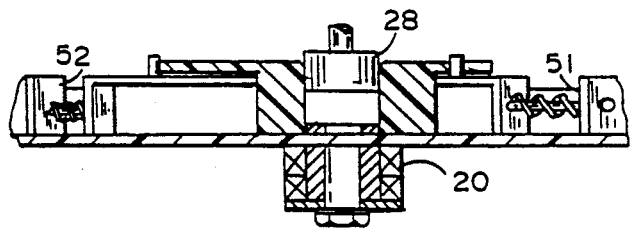
FIG. 6 is a section view taken along the lines VI—VI of FIG. 5A.
Figure 7:
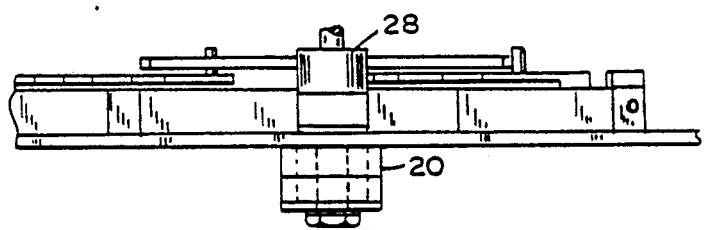
FIG. 7 is a section view taken along the lines VII—VII of FIG. 5A.
Figure 4:
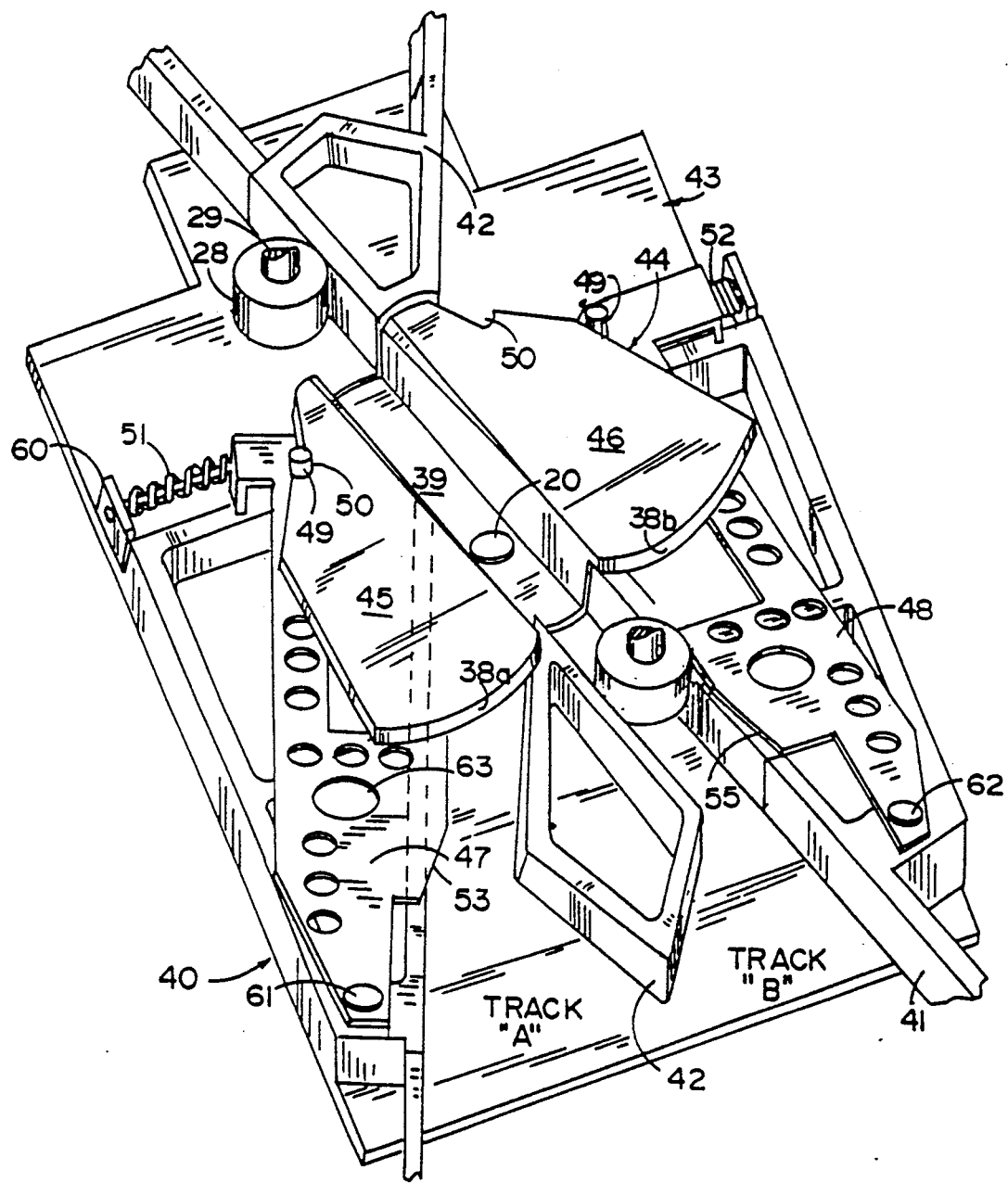
FIG. 4 is a top perspective view of a first embodiment of a track intersection pin guide according to the invention.

Switch assembly 40 includes two converging tracks, designated track A and track B (FIG. 4). Each track includes a vertical support rail 41 and guide member 42 by which each track acts to steer the pin and bearing associated with the shoe into the guide track. At the intersection of the guide tracks which cross to form an "x", a frog 44 is pivotally mounted in selective alignment with tracks A and B, to a base plate 43 using a stud shaft bearing assembly 20 best shown in attached FIGS. 6 and 7. Frog 44 includes a left divergent wing 45 having a cam surface 38a and a right divergent wing 46 having a cam surface 38b. Each cam surface is shaped in a manner to provide rotational movement of the frog, about its shaft 20 when a bearing 28 strikes the cam surface.

Switch assembly 40 further includes a left horizontal actuating member 47 and a right horizontal actuating member 48 each pivotally mounted by a left lower pivot point 61 and right lower pivot point 62, respectively, which may be a rivet or stud to provide permanent attachment to base plate 43. Horizontal actuating members 47, 48 may also include a plurality of holes 63 to reduce the switch assembly's overall weight Actuating members 47, 48 lock frog 44 into either of two fixed positions, depending on which track was last used. Each horizontal actuating member 47, 48 includes a vertically oriented locking pin, or member, 49 that is urged into a notch 50 on each side of the upper portion of frog 44 by a left resilient means 51 or a right resilient means 52, respectively, that are attached to base plate 43 with attachment means 60. Each resilient means 51, 52 biases the associated locking pin 49 into its associated notch 50. Each actuating member 47, 48 further includes an outwardly protruding portion 53.

Figure 5A:
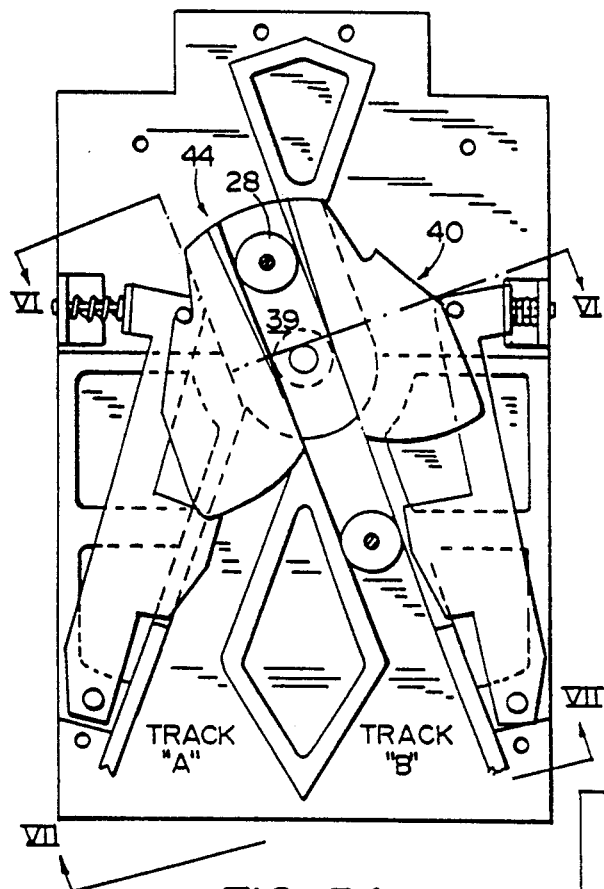
FIGS. 5A–5D are top plan views of the pin guide in FIG. 4 illustrated in various states of operation.

As best seen by reference to FIGS. 5A-5D, a guide pin 29 and bearing 28 are illustrated exiting switch assembly 40 from track B. If the next shoe assembly approaches from the same direction, the associated bearing 28 would pass through the channel 39 in frog 44 and move to the opposite track as shown in FIG. 5A without changing the orientation of frog 44.

Figure 5B:
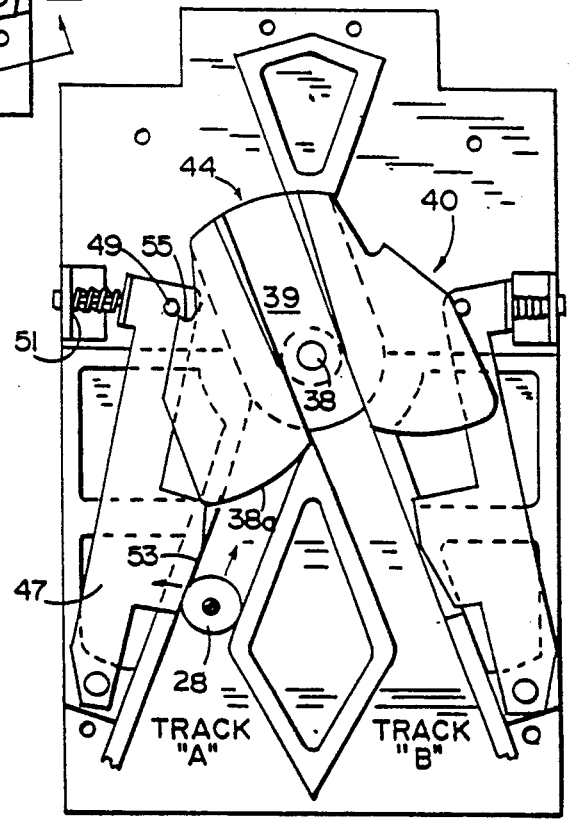

FIG. 5B illustrates the bearing of a shoe approaching the switch assembly from track A with the frog in the same position as illustrated in FIG. 5A. When the approaching bearing 28 makes contact with protruding portion 53 of left horizontal lock actuating member 47, a lateral force is produced to pivot the member away from the point of contact. This force pushes the associated locking pin 49 from the associated notched portion 50, while compressing left resilient means 51. Since frog 44 is no longer held in place by the force of the left resilient means 51, the frog is free to pivot about the shaft 20 in response to bearing 28 engaging cam portion 38a.

Figure 5C:
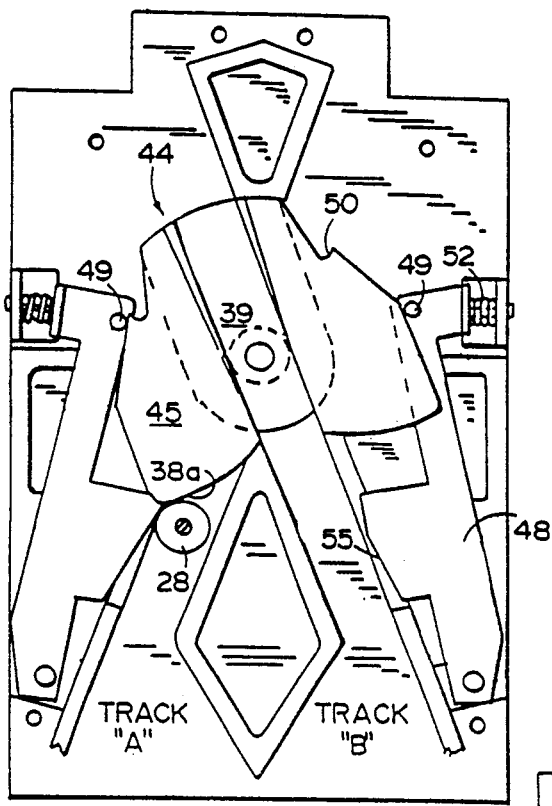
Figure 5D:
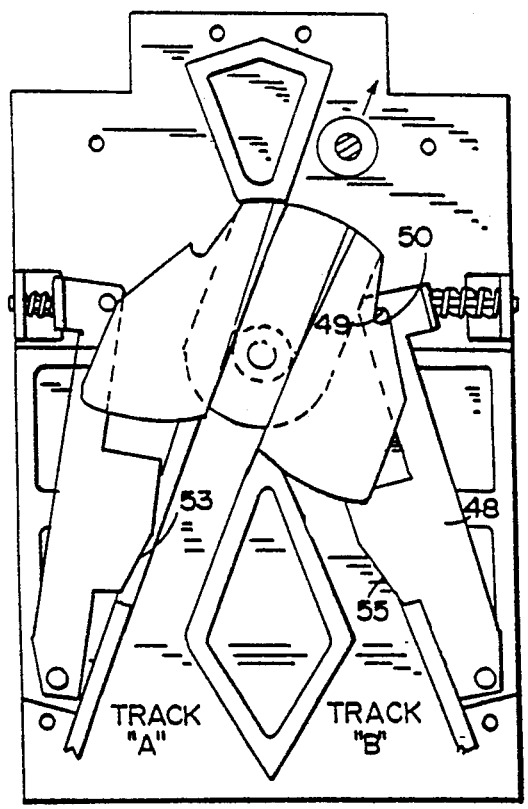

FIG. 5C illustrates the next sequential step in the movement of the shoe pin as it moves through track A the bearing on the shoe strikes the cam portion 38a of the left divergent wing 45, which will apply forces tending to cause frog 44 to pivot clockwise about shaft 20 into alignment with the opposite track. Both vertical lock pins 49 on each side of the frog ride the outer surface of each divergent wing while the frog is in its pivoting motion. When the frog 44 rotates completely into alignment with the opposite track, the right resilient means 52 will force the pin 49 associated with the right horizontal actuating member 48 into its associated notched portion 50. Additionally, the right horizontal actuating member 48 and its protruding portion 55 will be in a position extending laterally into the track B, as best seen in FIG. 5D, to make contact with an approaching shoe on track B. Protruding portion 53 will have moved to a position recessed within the track so as to avoid contact with shoes passing through track A. This reduces noise by eliminating the clicking sound of subsequent shoes passing through on the same track. Because of the symmetrical nature of the disclosed switch assembly 40, if a shoe were now approaching from the B track with frog 44 in the position illustrated in FIG. 5D, the operation of the switch would be identical to that previously described with frog 44 pivoting to the position illustrated in FIG. 5A.

FIGS. 8-11 illustrate a second embodiment having an alternative locking mechanism. A frog 44' is secured to a base member 43' by stud shaft 90. A pair of actuator mechanisms 80 operate in a vertical axis and are actuated by the bottom tip of pin 29 rather than bearing 28. Each actuator mechanism 80 includes an elongated resilient member having an arched portion 81 and a locking pin 79 which extends vertically through a guide passage 83 into selective engagement with a lock cavity 84 located in the associated divergent wing of frog 44'. Once the pin is removed from the cavity as illustrated in FIG. 11, the frog 44' is permitted to pivot freely to allow the bearing of the actuating shoe to move the frog into alignment with the alternative track in the manner previously set forth. This embodiment is different primarily in the application of the locking mechanism while the switch actuation is similar to that of the previously described embodiment. The lock mechanism in the embodiment illustrated in FIGS. 8–11 is vertically acting to selectively engage the lock cavity in each divergent wing of the frog. In the previous embodiment, the lock mechanism is horizontally acting. In both embodiments, the movement of the frog retains the locking pin removed from its cavity and its actuator in a deflected position This has the advantage of avoiding line noise resulting from subsequent shoe pins and bearings contacting the actuator of the through-track. In both embodiments, the guide member is made of Uniroyal Adiprene Urethan Rubber marketed by Uniroyal Rubber, Inc. The frog is made of Ultra High Molecular Weight Polythylene (UHMWP) made by Garland Manufacturing Co. All other components are made of steel.

Changes and modifications in the specifically described embodiments can be carried out without departing from the principles of the invention, which is intended to be limited only in the scope of the appended claims, as interpreted according to the principles of patent law including the Doctrine of Equivalents.

The embodiments of the invention in which an exclusive property or privilege is claimed are defined as follows:

1. A track intersection pin guide for an article sorting system having diverting members propelled by guide pins and guide tracks traversing at an intersection; for guiding said guide pins through a guide track intersection, said pin guide comprising:
   a horizontal plate including wall means defining a recessed channel configured to permit the passage of a guide pin;
   pivot means for pivotally mounting said plate to pivot about a vertical axis;
   latching means for securing said plate in either of two fixed positions, said channel being aligned with a different guide track in each of said positions; and
   biasing means associated with said latching means for biasing said latching means in engagement with said plate when said channel is aligned with either of said guide tracks.

2. A track intersection pin guide according to claim 1 in which said biasing means includes a resilient means for urging said latching means into a predetermined area of said plate to provide said securing engagement.

3. A track intersection pin guide according to claim 2 in which said predetermined area is a notched section on an section of said plate that is downstream of said pivot means with respect to movement of said guide pins.

4. A track intersection pin guide according to claim 1 in which said latching means includes a deactuation means which protrudes into one said guide track in order to release said latching means by a guide pin approaching in said guide track.

5. A track intersection pin guide according to claim 4 in which said deactuation means operates in a lateral motion moving said latching means laterally from said plate.

6. A track intersection pin guide according to claim 4 in which said deactuation means operates in a vertical motion thereby moving said latching means axially from said plate.

7. A track intersection pin guide according to claim 5 in which the force applied to said deactuation means is applied by a lateral surface of said guide pins.

8. A track intersection pin guide according to claim 6 in which the force applied to said deactuation means is applied by a horizontal surface of said guide pins.

9. A track intersection pin guide for an article sorting system having diverting members propelled by guide pins and guide tracks traversing at an intersection; for guiding said guide pins through a guide track intersection, said pin guide comprising:
   a switch plate which pivots about a pivot means and includes means defining a recessed guide channel to selectively guide approaching guide pins to one of alternate tracks;
   plural locking means, each including a locking pin for selectively engaging a notched portion of said switch plate and biasing means for biasing said locking pin into said notched portion of said switch plate to secure said plate in either of two fixed positions; and
   each of said locking means having a deactuating means protruding into a portion of the track associated with that locking means for retracting the associated locking pin from its switch plate notched portion upon the passage of a guide pin along the track associated with that locking means.

10. A track intersection pin guide according to claim 9 in which said switch plate includes changeover means for switching said switch plate between said fixed positions, said changeover means including two divergent wings each with a respective cam portion adapted to be engaged by a guide pin.

11. A track intersection pin guide according to claim 9 in which the deactuating means are laterally retractable by a lateral surface of an approaching guide pin.

12. A track intersection pin guide according to claim 11 in which said switch plate includes surface means operable on said locking pin for keeping the associated said deactuating means retracted after said switch plate has pivoted to an alternate position.

13. A track intersection pin guide according to claim 9 in which said locking pin is urged into said notched portion by an attached resilient means which applies a lateral force to said locking means.

14. A track intersection pin guide according to claim 9 in which said lateral deactuating means are defined by planar members with means defining holes therein to reduce overall weight.

15. A track intersection pin guide according to claim 9 in which said pivot means includes a stud shaft that is attached at a lower portion below said switch plate with a ball bearing assembly.

16. A track intersection pin guide for an article sorting system having diverting members propelled by guide pins and guide tracks traversing at an intersection; for guiding said guide pins through a guide track intersection, said guide pin comprising:
   a switch plate which pivots about a stud shaft and includes a recessed guide channel for passing guide pin to one of two fixed positions in line with an associated guide track;
   said switch plate further including two divergent wings, each with a respective cam surface which is adapted to be engaged by a guide pin moving in the associated guide track and a notch section for receiving a locking pin; and
   two latching members, each associated with a respective track and having a protruding portion that extends laterally into the associated said guide track, a locking pin attached to a downstream portion of the associated latching member, and in which each said locking pin is urged into the associated said notched section by an associated resilient means when the guide channel, is properly aligned with the guide track not associated with that latching member.

17. A track intersection pin guide according to claim 16 in which the force applied to said latching members protruding portion is provided by a lateral surface of an approaching guide pin.

18. A conveyor system comprising:
a plurality of elongate article supporting members moving in an endless path as the conveyor is operated;
at least one article diverter mounted to at least one of the supporting members for movement lengthwise relative thereto to divert articles along the length of said one of the supporting members conveyor is operated;
a guide element on said article diverter;
track means cooperating with the diverter guide element for moving the article diverter in a predetermined manner relative to said one of the supporting members as the conveyor is operated,
said track means including first and second crossing guide tracks,
said first guide track having a first surface for guiding the guide element in a first path,
said second guide track having a second surface for guiding the guide element in a second path,
said first surface having a first opening for permitting passage therethrough of the guide element moving along said second surface in said second path,
said second surface having a second opening for permitting passage therethrough of a guide element moving along said first surface in said first path;
mechanical switch means having a first position for blocking said first opening as an incident of said guide element moving in said first path to thereby prevent movement of said guide element through said first opening as it travels in said first path and having a second position for blocking said second opening as an incident of said guide element moving in said second path to thereby prevent movement of said guide element through the second opening as it travels in the second path; and
latch means for selectively latching said switch means in said first and second positions, said latch means being responsive to a guide element approaching said switch means in said first and second paths for unlatching said switch means to allow said switch means to change position.

19. The conveyor system in claim 18 wherein said switch means includes wall means defining a channel adapted to passing a guide element therethrough and changeover means for selectively aligning said channel with one of said first and second paths.

20. The conveyor system in claim 19 wherein said changeover means includes a first cam surface selectively positioned in said first path when said channel is aligned with said second path and a second cam surface selectively positioned in said second path when said channel is aligned with said first path.

21. The conveyor system in claim 18 including means for retaining said latch means unlatched during transition of said switch means between said first and second positions.

* * * * *

UNITED STATES PATENT AND TRADEMARK OFFICE
CERTIFICATE OF CORRECTION

PATENT NO. : 5,135,100

DATED : August 4, 1992

INVENTOR(S) : Cotter et al.

It is certified that error appears in the above-identified patent and that said Letters Patent is hereby corrected as shown below:

Column 1, Line 60:
    After "approaching" insert --.--;
Column 1, Line 62:
    "pi" should be --pin--;
Column 1, Line 63:
    After "tracks" insert --.--;

Column 3, Line 61:
    After "weight" insert --.--;
Column 5, Line 8:
    After "position" insert --.--;
Column 5, Claim 3, Line 49:
    Delete: "an section of".

Signed and Sealed this

Eleventh Day of January, 1994

Attest:

BRUCE LEHMAN

Attesting Officer    Commissioner of Patents and Trademarks